June 29, 1926.
A. A. HOLBECK
FURNACE
Filed Oct. 29, 1923
1,590,373
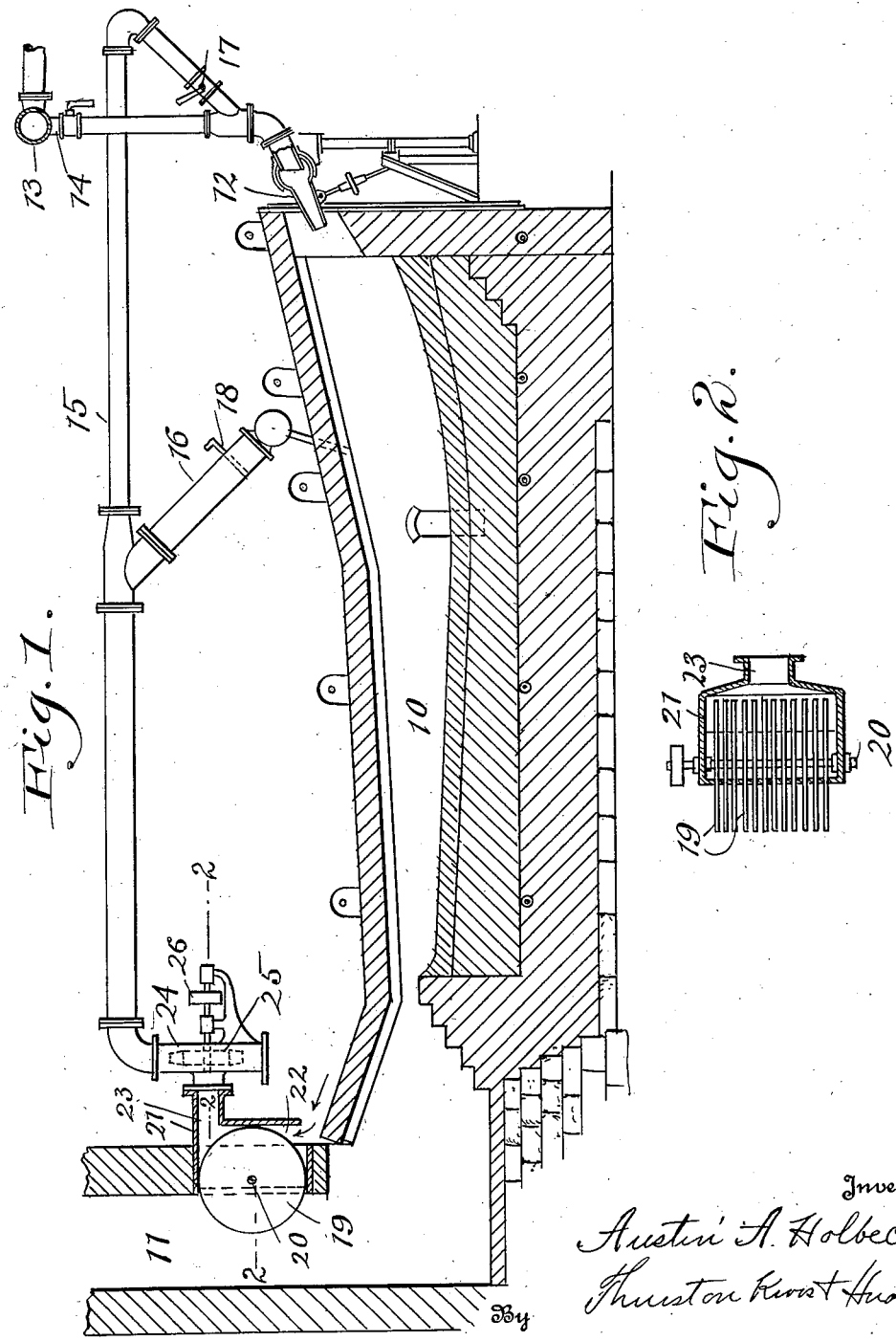

Patented June 29, 1926.

1,590,373

UNITED STATES PATENT OFFICE.

AUSTIN A. HOLBECK, OF CLEVELAND, OHIO.

FURNACE.

Application filed October 29, 1923. Serial No. 671,333.

This invention relates to furnaces such as used for melting iron or steel, and more particularly to a method and apparatus for heating either air used to support combustion or the gas used as a fuel before the same is supplied to the furnace.

In a more specific aspect, the invention relates but is not necessarily confined, to the utilization of the waste heat passing from the furnace for the accomplishment of the above.

Many attempts have been made, some more or less successful, to recover the waste heat from furnaces of different types and the devices most commonly employed are the ordinary regenerating chambers or checkers which are alternately heated by the waste gases passing from the furnace and then cooled by the incoming air or gas.

In other installations the hot waste gases and incoming cold air are caused to pass in opposite directions through parallel closely associated conduits so that a portion of the heat of the outgoing gases will be transmitted by conduction through the dividing walls to the incoming air.

In other instances the air for combustion purposes is heated by passing the same through pipes placed in the path of the hot outgoing gases, the air being circulated through these pipes and then delivered to the furnace.

All of these devices are expensive to install, they take up considerable space, and are therefore cumbersome, and many of them do not possess the desired degree of efficiency.

One of the objects of the present invention is to heat the air or gas which is to be supplied to the furnace preferably by utilizing the waste or heated outgoing gases by an improved method carried out by apparatus which is efficient but simple in construction and inexpensive to manufacture and install.

My invention involves what I believe to be new principles in this art in that a good conductor of heat such as metal is alternately brought in contact with the hot gases and then with the cold air or gas so that the heat transfer is made quickly and efficiently.

While the device may assume different forms, it may, for example, include a number of metal disks which can be continuously, or if desired, intermittently rotated so as to bring portions thereof into the heating medium and then into the relatively cold medium (air or gas) so as to heat the latter.

If the waste heat from the furnace is to be utilized as is generally the case, this device can be set into the lower part of the stack leading from the furnace with the disks or other movable heat conducting and heat transferring elements arranged so as to project into both the heating medium and the relatively cold medium to be heated.

The invention may be further briefly summarized as consisting in certain novel steps of the improved method and in certain novel details of construction and combinations and arrangements of parts which will be described in the specification and set forth in the appended claims.

In the accompanying sheet of drawings wherein I have shown one embodiment of my invention, that embodiment being one wherein the waste heat from the furnace is utilized to heat the air supplied to support combustion, Fig. 1 is vertical sectional view through the furnace showing a portion of the stack and my improved heating device set into the lower part thereof; Fig. 2 is a sectional view through the heating device substantially along the irregular line 2—2 of Fig. 1.

The details of the furnace are immaterial to my invention, but that shown has a hearth 10 on which the iron or steel is designed to be melted, and leading from the end of the furnace is a stack 11, from which the waste heat is conducted away from the furnace.

The particular fuel which is used is also immaterial, but in this instance the fuel consists of powdered coal which is delivered into the end of the furnace by a nozzle or burner 12. The powdered fuel is circulated through a distributing line 13 which may be connected to the nozzles of a number of furnaces by means of valved pipes 14, one of which is shown leading from the distributing line 13 to the nozzle 12.

The pulverized fuel is moved along the pipe 13 and through the pipe 14 to the nozzle 12 by means of a circulating stream of air, but in order that the air and pulverized fuel may be delivered to the furnace in the right proportions, a secondary air line 15 is connected to the pipe 14 just above the nozzle, as shown in Fig. 1. By means of a connection 16, the air may be introduced also into the top of the furnace. The delivery of air, whether to the burner or directly into the top of the furnace is controllable through valves indicated at 17 and 18.

The fuel distributing system here illustrated and briefly referred to, is common in the art, and per se does not constitute the present invention or a part thereof.

In this instance, my invention is utilized to heat the air which is supplied to the furnace through the pipe 15, the source of heat being the waste gases which pass up the stack 11, though as already stated, and as will be referred to presently, these are not essential features of the invention.

In carrying out my invention I utilize movable heat transferring members formed of suitable metal or other good heat conducting material, and arrange these so that they may be moved from contact with the heating medium to contact with the fluid to be heated.

In the preferred form of the invention a large number of rotary metal disks 19 are employed, mounted on a shaft 20 adapted to be rotated in any suitable manner, the disk projecting partly into the stack or other chamber or conduit carrying the heating medium, and partly outside the same. By circulating or causing the fluid to be heated to pass along the portions of the disk which are outside the stack or out of contact with the heating medium, and by rotating these disks preferably continuously, it is obvious that heated portions of the disks will be continuously brought into contact with the fluid to be heated. In other words, the inner portions of the disks are heated and the outer portions cooled, and due to the continuous rotation there is a continuous transference of heat from the heating medium to the fluid or medium to be heated. Preferably these disks 19 are mounted in a chamber 21 which is seated in the wall of the stack with considerable portions of the disks projecting through slots in the front wall of the chamber which may be flush or substantially flush with the inner wall of the stack as shown. The slots are preferably of such width that the sides of the upright members between the slots will engage or be sufficiently close to the disks to scrape off any accumulation of ash or other foreign material that may adhere to the disks when they are in contact with the waste gases passing from the furnace.

As shown, the lower part of the chamber 21 has an air inlet opening 22, and the top of the chamber has an outlet opening 23 so that the air in passing through this chamber from 22 to 23 is compelled to pass along or between the disks, and thereby be heated. In this instance the outlet 23 of the chamber is connected to the casing 24 of a fan or blower 25, which draws the air up through the chamber in contact with the revolving disks, and blows it through the pipe 15 and to the furnace.

The shaft to which the heat transferring disks 19 are secured and the blower shaft may be operated in any suitable manner, but in this instance they are shown provided with belt pulleys 26. Obviously the disks will be rotated at a rate such that the best heat transferring effect is obtained.

Inasmuch as both sides of the metal disks are exposed to the heat, a large surface is presented for the absorption of heat, and consequently for the dissipation or transference of heat to the incoming air or fluid to be heated. In this manner the heat transfer is accomplished quickly and efficiently. Furthermore, the device is simple to operate and inexpensive to manufacture and install.

As already stated, the invention is not confined to the heating of air, but might be advantageously used for heating gas which is to be supplied to the furnace as fuel.

Furthermore, I do not desire to be confined to the idea of installing this heating device in a furnace stack, or of utilizing the waste gases from a furnace as the heating medium, as the disks or other movable heating elements might be otherwise heated, as by a separate or independent source of heat. Additionally the movable heating elements which are moved from contact with the heating medium to contact with the fluid to be heated need not necessarily be in the form of disks, and if in the form of disks they are not of necessity mounted for rotation about a horizontal axis.

Briefly, therefore, I aim in my claims to cover all modifications which do not involve a departure from the spirit and scope of my invention as defined in the appended claims.

Having described my invention, I claim:

1. The method of heating a fluid to be supplied to a furnace, which comprises conducting said fluid through an inlet passage, a portion of which is adajcent the passage through which exhaust gases are discharged from the furnace, subjecting portions of a heat absorbing element successively to the action of the exhaust gases and to the fluid to be heated by moving said heat absorbing element so as to bring heated portions thereof from the exhaust passage into the inlet passage, and preventing passage of fluid with the moving element from one passage to the other.

2. In combination with a furnace having a hearth and a passage for conducting away waste gases, a second passage for supplying to the hearth a heating agency comprising a fluid, means for heating said fluid before it is supplied to the furnace comprising one or more movable heat conducting members extending into the first passage so as to be heated by the waste gases and into the second passage to impart heat to the fluid passing therethrough, means for moving said element or elements so as to bring heated portions thereof from contact with the waste gases to contact with the fluid to be heated, and means for preventing passage of fluid from one passage to the other.

3. A furnace having a conduit for waste gases, means for heating a fluid in the form of air or gas adapted to be supplied to the furnace for combustion purposes, comprising one or more rotary members projecting through an opening into said conduit so as to be heated by contact with the waste gases, means for causing the fluid to engage other portions of said member or members outside the conduit, means for rotating the latter so as to bring the heated portions from contact with the waste gases into contact with the fluid to be heated, and means associated with said rotary members for preventing passage of the fluid to the conduit or the waste gases from the conduit through said opening.

4. A furnace having a conduit for waste gases and an inlet passage for gases supplied to the furnace for combustion purposes, said conduit having an opening to said inlet passage, a heat tranferring member mounted in said opening and lying partly in said conduit and partly in said inlet passage, said member being movable to shift portions thereof from the interior of the conduit into the inlet passage, and means acting upon said heat transferring member for preventing accumulations of soot and tar thereon.

5. A furnace having a conduit for waste gases and an inlet for gases supplied to the furnace for combustion purposes, said conduit having an opening to said inlet, a rotary heat transferring member mounted in said opening, said heat transferring member comprising a plurality of disks arranged side by side and spaced apart, and a grating having bars interposed between said disks and cooperating therewith to close said opening against passage of gases and for preventing the accumulation of soot and tar upon said disks.

6. A furnace having a conduit for waste gases and an inlet for gases supplied to the furnace for combustion purposes, said conduit having an opening to said inlet, a rotary heat transferring member mounted in said opening, said heat transferring member comprising a plurality of disks arranged side by side and spaced apart, and scrapers engaging the side faces of the disks.

In testimony whereof, I hereunto affix my signature.

AUSTIN A. HOLBECK.